W. SANDERSON.
HOISTING MECHANISM FOR DUMPING VEHICLES.
APPLICATION FILED JAN. 3, 1918.

1,332,308.

Patented Mar. 2, 1920.
2 SHEETS—SHEET 1.

INVENTOR

W. SANDERSON.
HOISTING MECHANISM FOR DUMPING VEHICLES.
APPLICATION FILED JAN. 3, 1918.

1,332,308.

Patented Mar. 2, 1920.
2 SHEETS—SHEET 2.

INVENTOR
William Sanderson
By Kay Arthur Powell
Attys

UNITED STATES PATENT OFFICE.

WILLIAM SANDERSON, OF PITTSBURGH, PENNSYLVANIA.

HOISTING MECHANISM FOR DUMPING-VEHICLES.

1,332,308.  Specification of Letters Patent.  Patented Mar. 2, 1920.

Application filed January 3, 1918. Serial No. 210,200.

*To all whom it may concern:*

Be it known that I, WILLIAM SANDERSON, a citizen of the United States, and resident of Pittsburgh, in the county of Allegheny and State of Pennsylvania, have invented a new and useful Improvement in Hoisting Mechanism for Dumping-Vehicles; and I do hereby declare the following to be a full, clear, and exact description thereof.
My invention relates to dumping vehicles, such as truck wagons, automobile trucks and the like, more particularly to apparatus for hoisting and for tilting the vehicle body so that the contents will discharge therefrom.
The invention is directed to a type of hoisting apparatus such as shown in an application filed by me, Serial No. 196,291, filed Oct. 12, 1917, and the invention aims to improve that apparatus.
It is the primary object of the present invention to provide a derrick type of hoisting apparatus which is highly efficient for lifting and stabilizing the load, and which requires but very little head room above the top of the vehicle body.

A further object is to provide a hand operated apparatus comprising simple sheave and cable mechanism adapted for easy handling of the heaviest loads for which the vehicle is designed. And a further object is to so construct the hoist that it may be readily installed on standard auto-vehicles without interfering with, or requiring alteration of the propelling shafts, transmission and other fixtures of the vehicle.

Figure 1:
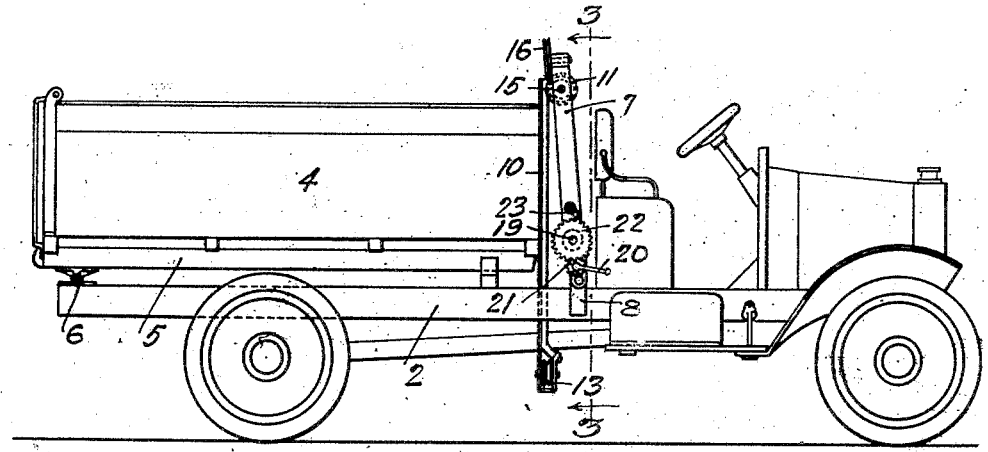
Figure 2:
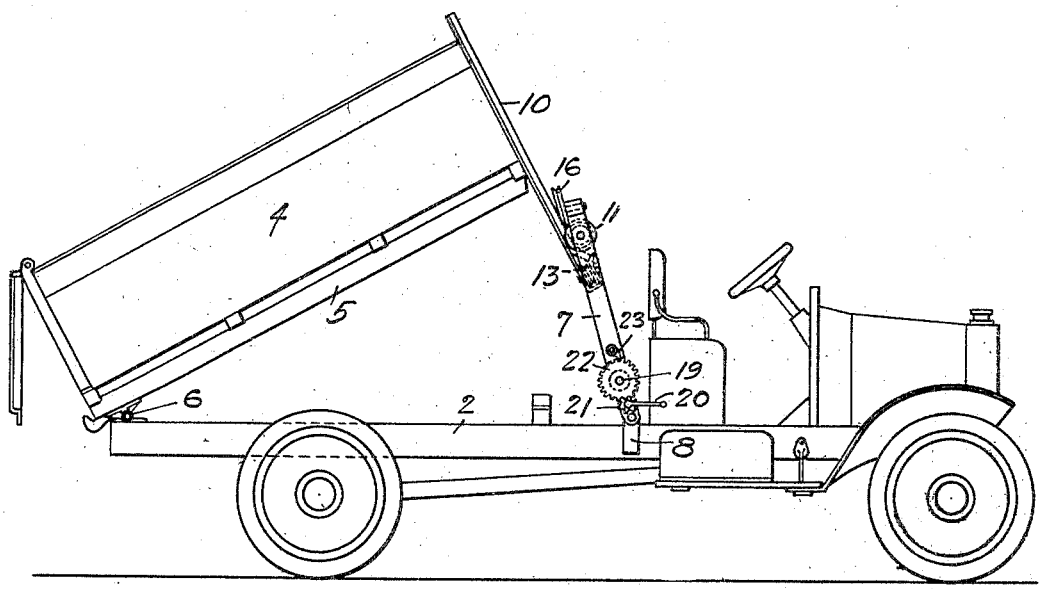
Figure 3:
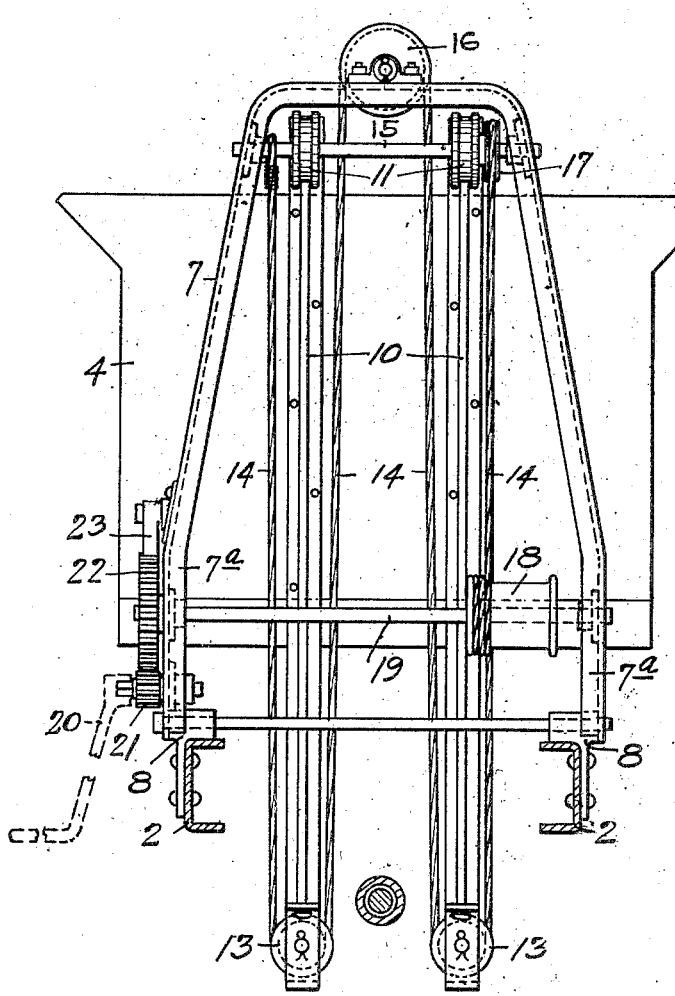
Figure 4:
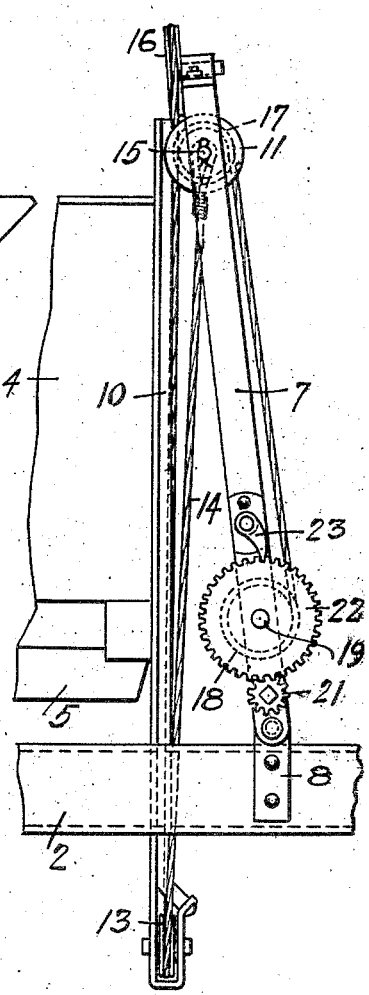

In the accompanying drawings, Figure 1 is a side elevation of an automobile truck with my improved hoisting apparatus applied thereto; Fig. 2 is a like view with the body of the vehicle tilted or in discharging position; Fig. 3 is an enlarged transverse section taken on the line 3—3, Fig. 1; and Fig. 4 is a side elevational view of the hoisting apparatus.
In the drawings the numeral 2 designates the frame of a vehicle, and in the instance shown, the frame is the chassis of an automobile. Mounted upon the chassis is the dumping body 4, a suitable underframe 5 being employed to provide for proper elevation for clearance of the body above the wheels. The body is hinged to the end of the frame as at 6. Preferably the end of the body terminates at the hinge point of connection with the frame, so as to provide for the greatest clearance between the end of the body and the ground when the body is in tilted position. I do not, however, wish to limit my invention to such form of construction as it will be seen, as hereinafter described the hoisting apparatus is applicable to dumping vehicles in which the pivotal point of connection may be disposed differently.

The apparatus for tilting the body comprises a derrick 7 mounted upright on the frame between the body and the seat. The derrick preferably is formed from a single length of standard channel section girder, bent to substantially U-shape. The legs 7ª of the derrick so formed are pivotally connected at their ends to brackets 8 secured to the frame of the vehicle. The derrick is provided with suitable winch type of hoisting mechanism as will hereinafter be described.

The derrick is adapted to be supported in upright position at all times, as distinguished from collapsible and telescoping types of derricks, and to this end I employ rails 10 which are secured to the end of the body and which are adapted to engage wheels 11 journaled in the upper end of the derrick frame, the pivoted foot of the derrick being so disposed in respect to the rail as to permit the derrick to lean toward the body and against the rails. These rails preferably are single lengths of T bars, the central leg of the T forming the track for the wheels, and the flanges of the bar affording means for attaching the bar to the body. Two rails are employed arranged vertically in parallel relation and spaced apart one each side of the longitudinal center of the vehicle so as to permit installing on autovehicles without fouling the propelling shafts and mechanism. The rails extend downwardly from a point substantially at the top of the body and are of such length as to provide support for the derrick throughout the movement of the body. The rails preferably also serve as means for attaching the hoisting cable to the body, and in this instance I provide cable sheaves 13 which are journaled to the lower ends of the rails.

By the above described arrangement of rails I am enabled to employ a simple form of derrick requiring less head room than extensible or telescoping types of derricks for swinging the body to dumping position. As it will be seen, I obtain the required lift or travel of the body for dumping by having the point of connection of the hoisting cable to the body at a point below the body and its horizontal pivotal plane. Preferably the connecting point, i. e., the sheaves 13, are placed at a distance below the pivot of the body substantially equal to one-half of the length of the swinging travel of the body, thus requiring only an equal length of derrick above the pivotal point to its cable sheaves, for effecting the full maximum travel of the body. Furthermore, the above arrangement of rails and pivoted derrick provides for a more direct vertical pull of the hoisting cable than would be the case if a fixed type of derrick were employed.

An important point in all dumping vehicles of this type, i. e., hand-operated dumping vehicles, is the provision as far as possible of simple power mechanism for quickly and easily elevating the body. This has been provided for in this invention by the employment of a winch type of cable mechanism which is adapted to be operated by a hand crank, the winding connections of the cable, and the gearing being so designed that a minimum effort is required to tilt the body. A single cable 14 is attached at one end to the upper end of the derrick, preferably to the shaft 15 upon which the guide wheels 11 are mounted. The cable passes down around one of the sheaves 13 on rail 10, then up and over a sheave 16 mounted centrally upon the upper end of the derrick, and then down to sheave 13 on the other rail 10 and then up to a sheave 17 on the shaft 15 and then to the winding drum 18.

The drum is secured to a winding shaft 19 journaled in the derrick frame and is rotated by a hand crank 20 which drives a stub shaft mounted in the derrick, the stub shaft has the pinion 21 which meshes with a gear 22 fast to shaft 19. A pawl 23 pivoted to the derrick is adapted to engage the teeth of gear 22 for locking the drum against reverse movement in a manner which is well understood. The above arrangement of sheaves gives a large amount of power for handling the load. Ordinarily a simple sheave and cable arrangement such as represented by one half of the above described arrangement is ample for average loads, but such simple sheave design is objectionable as it cannot be employed centrally with auto-vehicles having a centrally disposed transmission mechanism without employing a complicated and high derrick. The double or compound arrangement of sheaves as shown not only provides for the employment of a shorter derrick as explained above, but such arrangement provides also for increased power which is as 2 to 1 compared with the simple arrangement of sheaves. Compounding of power in this manner makes for the easy handling of the work, and the double arrangement of rails facilitates in the attainment of stabilizing the load in lifting by providing a wide bearing between body and derrick which prevents twisting and damaging strains.

It will be seen from the foregoing description of the invention, I have provided an extremely simple and economical yet thoroughly strong hoisting apparatus for this class of vehicles. The invention is shown in its preferable form but it will be apparent to those skilled in the art many changes may be made in its structural details without departing from the principle of the invention.

What I claim is:

1. In a dumping vehicle, the combination with the frame of the vehicle, of a body hinged to the frame, means for swinging the body on its hinge comprising a derrick pivotally mounted on the frame and including hoisting mechanism, a pair of rails vertically disposed on the end wall of the body adapted for propping the derrick in load sustaining position, said rails extending below the plane of the bottom of the body for propping the derrick when said body has been elevated above the derrick, and connections between the lower ends of the rails and the hoisting mechanism for swinging the body.

2. In a dumping vehicle, the combination with the frame of the vehicle, of a body hinged to the frame, means for swinging the body on its hinge comprising a derrick pivotally mounted on the frame and including hoisting mechanism, a pair of substantially straight rails vertically disposed and secured to the end wall of the body adapted to have traveling engagement with the derrick throughout the swinging movement of the body, said rails extending at their lower ends below the plane of the bottom of the body adapted to form a support for the derrick when said body has been swung above the derrick, and connections at the lower ends of the rails and to the hoisting mechanism for swinging the body on its hinge.

3. In a dumping vehicle, the combination with the frame of the vehicle, of a swinging body hinged to the frame, means for swinging the body on its hinge to dumping position comprising a derrick pivotally mounted on the frame, and including hoisting mechanism, a pair of rails vertically disposed on the end wall of the body, a pair of wheels journaled in the top of the derrick engaging the rails, said rails having extensions projecting below the plane of the bottom of the body to form a track for the wheels whereby the derrick will be supported in upright position when said body has been swung above the derrick, a sheave at the lower end of each rail, and a cable engaging the sheaves and connected to the hoisting mechanism for swinging the body.

4. In a dumping vehicle, the combination with the frame of the vehicle, of a body hinged to the end of the frame, means for swinging the body on its hinge to dumping position comprising a derrick pivotally mounted on the frame and including hoisting mechanism, a pair of rails vertically disposed on the end wall of the body and spaced apart one at each side of the central vertical plane of the body for supporting the derrick in upright position, said rails extending at their lower ends beyond the plane of the bottom of the body to form a support for the derrick when said body has been swung above the derrick, a pair of wheels at the top of the derrick engaging said rails, a cable sheave journaled to the lower end of each rail, sheaves on the derrick, and a cable connecting the sheaves and the hoisting mechanism for swinging the body on its hinge.

5. In a dumping vehicle, the combination with the frame of the vehicle, of a body hinged to the end of the frame, means for swinging the body on its hinge to dumping position comprising a derrick pivotally mounted on the frame, a pair of guide rails vertically disposed and secured to the end wall of the body, one each side of the central vertical plane of the body for supporting the derrick in upright position, said rails extending below the plane of the bottom of the body adapted to support the derrick when the body has been swung above the derrick, flanged guide wheels journaled in the top of the derrick engaging the rails, compound winding mechanism comprising a cable sheave on the lower end of each rail, a pair of sheaves journaled to the top of the derrick, a cable fastened at one end to the top of the derrick and engaging said sheaves and connected at its other end to a winding drum on the derrick, and mechanism for rotating the drum to wind up the cable to elevate the body.

In testimony whereof I, the said WILLIAM SANDERSON, have hereunto set my hand.

WILLIAM SANDERSON.

Witnesses:
WILLIAM L. THOMAS,
WALTER D. YOUNG.